(12) United States Patent
Ochsenfeld

(10) Patent No.: US 10,330,567 B2
(45) Date of Patent: Jun. 25, 2019

(54) MONITORING OF A MACHINE WITH A ROTATING MACHINE COMPONENT

(71) Applicant: SIEMENS AKTIENGESELLSCHAFT, München (DE)

(72) Inventor: Henning Ochsenfeld, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 322 days.

(21) Appl. No.: 15/098,664

(22) Filed: Apr. 14, 2016

(65) Prior Publication Data

US 2016/0305844 A1 Oct. 20, 2016

(30) Foreign Application Priority Data

Apr. 15, 2015 (EP) .................................. 15163653

(51) Int. Cl.
*G01M 13/00* (2019.01)
*G01M 13/028* (2019.01)
(Continued)

(52) U.S. Cl.
CPC .......... *G01M 13/028* (2013.01); *G01H 1/003* (2013.01); *G01M 7/00* (2013.01); *G01H 1/006* (2013.01)

(58) Field of Classification Search
None
See application file for complete search history.

(56) References Cited

U.S. PATENT DOCUMENTS 5,602,761 A 2/1997 Spoerre et al.
6,389,887 B1 * 5/2002 Dusserre-Telmon ........................
G01H 1/003
73/114.77

(Continued)

FOREIGN PATENT DOCUMENTS

CN 103608739 A 2/2014
EP 1014054 A2 6/2000
EP 2626682 A1 8/2013

OTHER PUBLICATIONS

Tavner P J: "Review of condition monitoring of rotating electrical machines"; IET Electric Power Applications; Bd. 2 Nr. 4; pp. 215-247; XP006031262; ISSN: 1751-8679; DOI: 10.1049/IET-EPA:20070280.

(Continued)

*Primary Examiner* — Evren Seven
(74) *Attorney, Agent, or Firm* — Henry M. Feiereisen LLC

(57) ABSTRACT

In a method for the automated monitoring of a machine with a rotating machine component, at successive measurement times parameter values ($P_t$) of operating parameters of the machine and in each case over a predefined measurement duration, vibrations of the machine are recorded. A vibration spectrum ($Y_t(f)$) of the vibrations recorded during the measurement duration is determined for each measurement duration. A mean power density ($\Phi_t^{(i)}$) of the vibration spectrum ($Y_t(f)$) is in each case determined from the vibration spectrum ($Y_t(f)$) for a multiplicity of frequency ranges. During a learning phase a model function ($\hat{\Phi}^{(1)}(P)$ to $\hat{\Phi}^{(N)}(P)$) for an averaged power density is determined for each frequency range as a function of the operating parameters. During a monitoring phase for each measurement time and each frequency range an expected mean power density ($\hat{\Phi}^{(i)}(P_t)$) is determined from the model function ($\hat{\Phi}^{(1)}(P)$ to (Continued)

$\hat{\Phi}^{(N)}(P)$) established in the learning phase for the frequency range, and compared with the mean power density ($\Phi_t^{(i)}$) established from the recorded vibrations.

12 Claims, 4 Drawing Sheets

(51) Int. Cl.
*G01H 1/00* (2006.01)
*G01M 7/00* (2006.01)

(56) References Cited

U.S. PATENT DOCUMENTS

| | | | |
|---|---|---|---|
| 6,484,109 B1* | 11/2002 | Lofall | G01H 1/003 |
| | | | 702/56 |
| 9,885,634 B2* | 2/2018 | Hedin | G01M 13/028 |
| 2001/0037180 A1* | 11/2001 | Komura | G01H 1/003 |
| | | | 702/56 |
| 2005/0119840 A1 | 6/2005 | Astley et al. | |
| 2007/0260656 A1* | 11/2007 | Wiig | G01H 1/003 |
| | | | 708/200 |
| 2011/0276247 A1* | 11/2011 | Carratt | F02C 9/28 |
| | | | 701/100 |
| 2011/0290024 A1* | 12/2011 | Lefler | G01H 1/003 |
| | | | 73/579 |
| 2011/0295557 A1* | 12/2011 | Hedin | G01H 1/003 |
| | | | 702/183 |
| 2014/0049285 A1* | 2/2014 | Rodriguez | G01H 1/003 |
| | | | 324/765.01 |
| 2014/0116124 A1 | 5/2014 | Edwards | |
| 2015/0122037 A1* | 5/2015 | Obaia | F04D 15/0088 |
| | | | 73/660 |
| 2015/0226603 A1* | 8/2015 | Hedin | G01H 1/003 |
| | | | 702/39 |

OTHER PUBLICATIONS

Wang W J et al: "Early detectin of gear failure by vibration analysis—I. Calculation of the time-frequency distribution"; Mechanical Systems and Signal Processing; London GB; Bd 7 Nr. 3; pp. 193-203; XP002485748; ISSN: 0888-3270; DOI: 10.1006/MSSP. 1993.1008.

Bartelmus W et al: "A new feature for monitoring the condition of gearboxes in non-stationary operating conditions"; Mechanical Systems and Signal Processing; London GB; Bd 23 Nr. 5; pp. 1528-1534; XP026066557; ISSN: 0888-3270; DOI: 10.1016/J.YMSSP. 2009.01.014.

* cited by examiner

MONITORING OF A MACHINE WITH A ROTATING MACHINE COMPONENT

CROSS-REFERENCES TO RELATED APPLICATIONS

This application claims the priority of European Patent Application, Serial No. 15163653.7, filed Apr. 15, 2015, pursuant to 35 U.S.C. 119(a)-(d), the disclosure of which is incorporated herein by reference in its entirety as if fully set forth herein.

BACKGROUND OF THE INVENTION

The present invention relates to a method for the monitoring of a machine with a rotating machine component.

The following discussion of related art is provided to assist the reader in understanding the advantages of the invention, and is not to be construed as an admission that this related art is prior art to this invention.

In the industrial environment components of machines with a rotating machine component, such as for example transmission bearings of transmissions built into drive trains, frequently exhibit anomalies after a usually unpredictable length of time, which stem either from natural wear and tear or sporadically occurring material or system faults. In many areas of application, the timely detection of a fault of this kind has a high priority, as the procurement of certain replacement components is time-consuming, operational downtime is cost-intensive or damage is problematic in some other way. For this reason a contract is frequently concluded with a service provider, known as a "Maintenance Service", which charges the service provider with the timely detection of anomalies and the initiation of possible maintenance measures. Services of this kind (Maintenance Services) are currently minimally automated and are thus performed with a correspondingly high level of human effort.

It would therefore be desirable and advantageous to provide an improved method for the monitoring of a machine with a rotating machine component to obviate prior art shortcomings.

SUMMARY OF THE INVENTION

In the inventive, automated method for the monitoring of a machine with a rotating machine component, parameter values of operating parameters of the machine are recorded at a succession of measurement times and vibrations of the machine are in each case recorded over a predefined measurement duration. A vibration spectrum of vibration amplitudes depending on vibration frequencies of the vibrations recorded during the measurement duration is determined for each measurement duration. A mean power density of the vibration spectrum is in each case determined from the vibration spectrum for a multiplicity of frequency ranges. During a learning phase comprising a multiplicity of measurement times, a model function for an expected power density averaged out across the frequency range is determined from the mean power densities established for these measurement times and recorded parameter values for each frequency range as a function of the operating parameters. During a monitoring phase a deviation measure for deviation of the mean power density established from the recorded vibrations from an expected mean power density is formed for each measurement time and each frequency range. Here, the mean power density expected for a measurement time and a frequency range is formed as the function value of the model function established in the learning phase for the frequency range at the point defined by the parameter values recorded at the respective measurement time.

A method according to the present invention thus provides a learning phase and a monitoring phase. During the learning phase parameter values of operating parameters of the machine and vibrations from the machine are repeatedly recorded, and a model function for different frequency ranges is in each case determined from these, which gives an expected mean power density from vibration amplitudes in the respective frequency range as a function of the operating parameters. In the monitoring phase parameter values of the operating parameters of the machine and vibration of the machine are likewise recorded, and the recorded vibrations are separately evaluated on the basis of the model functions established for each frequency range in the learning phase.

The model functions determined in the learning phase reflect machine-specific properties of the machine and form the basis for the evaluation of the measured data recorded in the monitoring phase. The method is thereby advantageously applicable on a generic basis, that is to say for different machines, without it being necessary to know the machine-specific properties of the machines in advance, as these properties are automatically learned during the learning phase and are reflected in the model functions established during the learning phase.

The separate evaluation of different frequency ranges enables high-quality modeling by simple model functions, for example by linear functions of the operating parameters, the determining of which requires only a few items of measured data. A brief learning phase advantageously results from this, which can also be repeated without problems or major delay, for example to take account of significant changes to the machine and/or its environment.

Overall the method according to the present invention enables automated monitoring of machines of a generic type and thereby reduces in particular the human effort required for monitoring of the machines and the resultant susceptibility to error of such monitoring.

According to another advantageous embodiment of the present invention, the machine can be a transmission. This embodiment of the invention takes account of the fact that transmissions in particular are susceptible to the incidence of wear- and system-dependent anomalies and are amenable to efficient monitoring through the inventive evaluation of vibration spectrums.

According to another advantageous embodiment of the present invention, a torque and/or a rotational speed and/or a temperature of a rotating machine component of the machine can be used as operating parameters. This embodiment advantageously makes use of the fact that as a rule torques, rotational speeds and temperatures of rotating machine components have a particularly strong influence on the vibration spectrums recorded in these machine components, and are thus particularly relevant and suitable as operating parameters for the evaluation of the vibration spectrums.

According to another advantageous embodiment of the present invention, the width of the frequency ranges can grow monotonously as the vibration frequency increases. The increase in the width of the frequency ranges with increasing vibration frequency is in particular then advantageous if the information content of the vibration spectrums relevant to the monitoring of the machine diminishes with increasing vibration frequencies, as is frequently the case.

According to another advantageous embodiment of the present invention, the model function can be determined for each frequency range as a linear function of the operating parameters, while a linear multiple regression model is trained for estimation of the model function. Linear functions of the operating parameter can advantageously be established in a particularly simple and rapid manner, that is to say from few items of measured data. As already mentioned above, the inventive method enables sensible use of linear functions of the operating parameters for the modeling of expected power densities as a result of the inventive frequency range-specific evaluation of the vibration spectrums.

According to another advantageous embodiment of the present invention, a power density difference between the mean power density can be established from the recorded vibrations and the expected mean power density can be normalized to a standard normal distribution is formed as a deviation measure for each measurement time and each frequency range. Deviation measures normalized to a standard normal distribution advantageously enable a simple and readily comprehensible interpretation and evaluation of the deviation measures.

Here, the normalized power density difference for a measurement time and a frequency range is preferably formed according to $$z_t^{(i)} = \frac{\delta_t^{(i)} - \mu_{t-1}^{(i)}}{\sigma_{t-1}^{(i)}}$$

from a power density difference $\delta_t^{(i)}$ between the mean power density, which is determined from the vibrations recorded at the measurement time, and the mean power density expected for the measurement time, a smoothed expected value $\mu_{t-1}^{(i)}$ of the power density differences for a measurement time preceding the measurement time and a smoothed standard deviation $\sigma_{t-1}^{(i)}$ of the power density differences for the measurement time preceding the measurement time. Here, t is a time index, which numbers the measurement times according to their chronological order, and i is a frequency range index, which numbers the frequency ranges.

The power density differences $\delta_t^{(i)}$ are thereby respectively normalized to standard normally distributed power density differences $z_t^{(i)}$, which in each case indicate a distance to their own distribution. Expressed in another way, the power density differences $\delta_t^{(i)}$ are thereby transformed into statistical values, which in particular enable the use of customary confidence intervals of the standard normal distribution for the interpretation and evaluation of the power density differences.

The smoothed expected value $\mu_t^{(i)}$ for a measurement time can advantageously be formed depending on the power density difference $\delta_t^{(i)}$ for this measurement time and the smoothed expected value $\mu_{t-1}^{(i)}$, for the measurement time preceding the measurement time according to $$\mu_t^{(i)} = \lambda \delta_t^{(i)} + (1-\lambda)\mu_{t-1}^{(i)},$$

wherein λ is a smoothing parameter.

Furthermore, the smoothed standard deviation $\sigma_t^{(i)}$ for a measurement time can be formed depending on the power density difference $\delta_t^{(i)}$ and the smoothed expected value $\mu_t^{(i)}$ for this measurement time and the smoothed standard deviation $\sigma_{t-1}^{(i)}$ for the measurement time preceding the measurement time according to $$(\sigma_t^{(i)})^2 = \lambda(\delta_t^{(i)} - \mu_t^{(i)})^2 + (1-\lambda)(\sigma_{t-1}^{(i)})^2,$$

wherein λ is a smoothing parameter.

The aforementioned embodiments of the invention advantageously enable continuous rolling updating of the distribution parameters $\mu_t^{(i)}$ and $\sigma_t^{(i)}$ used for calculation of the normalized power density differences $z_t^{(i)}$ as a consequence of their recursive above definitions.

The smoothing parameter λ occurring in the above definitions of the distribution parameter $\mu_t^{(i)}$ and $\sigma_t^{(i)}$ can advantageously be formed according to $$\lambda = 1 - \exp\left(\frac{-1}{\tau f_s}\right)$$

from a predefinable time constant τ and a sampling rate $f_s$ of the recording of the vibrations of the machine.

An exponential smoothing of the distribution parameter $\mu_t^{(i)}$ and $\sigma_t^{(i)}$ with a predefinable time constant τ is thereby achieved. This in particular enables the elimination or suppression of possibly occurring trend signal components which are, for example, caused by natural wear and tear, and progress only slowly, by specifying a sufficiently large time constant τ. Signals of appropriately timed relatively rapidly occurring anomalies are not influenced thereby.

According to another advantageous embodiment of the present invention, a tolerance interval for the deviation measure can be predefined and it can be determined for each measurement time and each frequency range whether the deviation measure lies within the predefined tolerance interval. The tolerance interval for the deviation measure advantageously delivers a quantitative criterion automatically applicable for frequency range-specific evaluation of the mean power densities for each measurement time.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
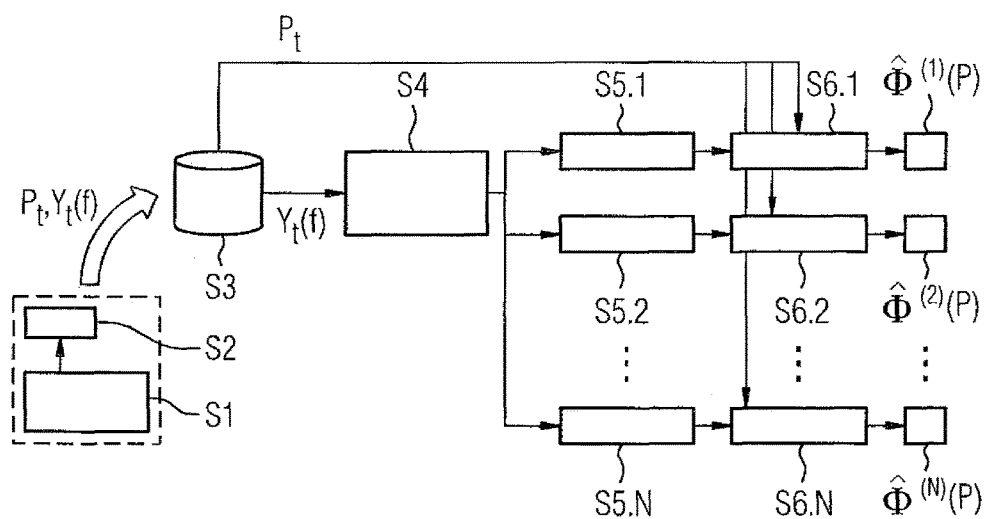
FIG. 1 shows a flowchart of a learning phase of a method for the monitoring of a machine in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

An inventive method for the monitoring of a machine with at least one rotating machine component, for example a transmission, comprises (at least) one learning phase and (at least) one monitoring phase.

FIG. 1 shows a flowchart of a learning phase of the method. In a method step S1 during the learning phase parameter values $P_t$ of operating parameters P of the machine and vibrations of the machine in each case over a predefined measurement duration are recorded at successive measurement times (in the case of a multiplicity of operating parameters $P_t$ designates a tuple of measured values). Here, t is a time index, which numbers measurement times according to their chronological order. A torque and/or a rotational speed and/or a temperature of the respective rotating machine component are for example used as operating parameter P, whose parameter values $P_t$ are recorded by corresponding sensors. The vibrations are recorded by at least one vibration sensor. If for example the machine to be monitored is a transmission with a transmission bearing or a multiplicity of transmission bearings, for each transmission bearing a vibration sensor is for example arranged on the respective transmission bearing or in its vicinity.

In order to simplify the description and notation it is assumed in the following that only one vibration sensor is present. In cases where a multiplicity of vibration sensors are present, method steps described in the following are set out separately for each vibration sensor.

In a method step S2, for each measurement duration, a discrete vibration spectrum $Y_t(f)$ of vibration amplitudes Y depending on vibration frequencies f of the vibrations recorded during the measurement duration is determined preferably by a fast Fourier transformation, of the sensor signals from the respective vibration sensor.

In a method step S3 the parameter values $P_t$ and vibration spectrums $Y_t(f)$ recorded for the individual measurement times are stored, for example in a database.

In a method step S4 subspectra are formed from each vibration spectrum $Y_t(f)$ N, which in each case contain vibration amplitudes of a frequency range.

Figure 2:
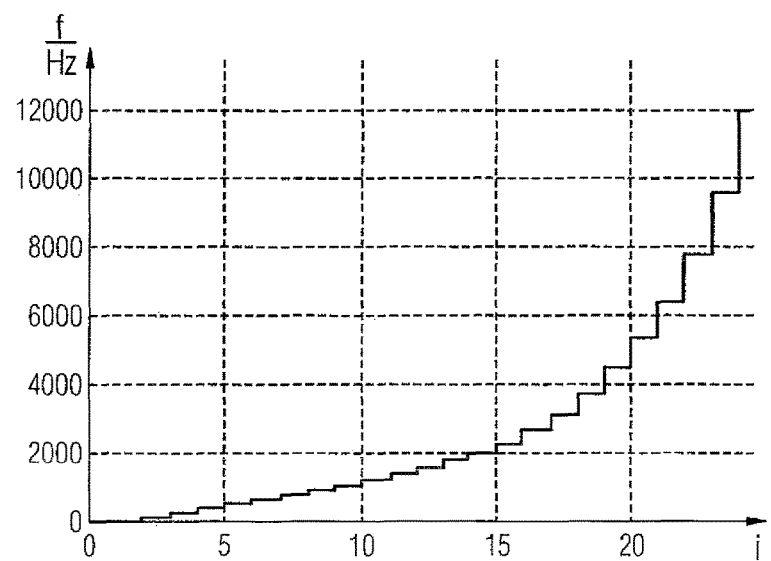
FIG. 2 shows frequency ranges of vibration frequencies.

By way of example FIG. 2 shows the distribution of vibration frequencies f between 0 Hz and 12000 Hz over frequency ranges (i=1, ..., N) numbered with a frequency range index i, whose width grows monotonously with increasing vibration frequency f. An increase in the width of frequency ranges with increasing vibration frequency f shown in FIG. 2 is advantageous, if the information content of the vibration spectrums relevant to the monitoring of the machine diminishes with increasing vibration frequencies f, as is frequently the case. In other exemplary embodiments, where this is not the case, the frequency ranges can also have differently distributed widths, for example the same width in each case and/or overlap each other.

In the method steps S5.1 to S5.N a mean power density $\Phi_t^{(i)}$ is calculated in each case for one of the N subspectra of each vibration spectrum $Y_t(f)$ according to $$\Phi_t^{(i)} = \frac{1}{L^{(i)}} \sum_{l=1}^{L^{(i)}} |Y_t(f_l)|^2, \qquad [1]$$

wherein i is the frequency range index, t the time index, l a frequency index, which numbers the vibration frequencies f of the $i^{th}$ subspectrum, that is the vibration frequencies f of the discrete vibration spectrum $Y_t(f)$ contained in the $i^{th}$ frequency range, $L^{(i)}$ is the number of the vibration frequencies f of the $i^{th}$ subspectrum, and $Y_t(f_l)$ is the vibration amplitude established for the measurement time with the time index t and the vibration frequency f with the frequency index l of the $i^{th}$ subspectrum.

In method steps S6.1 to S6.N, for each frequency range a model function $\hat{\Phi}^{(1)}(P)$ to $\hat{\Phi}^{(N)}(P)$ is determined from the mean power densities $\Phi_t^{(i)}$ established for this frequency range in the method steps S5.1 to S5.N and the recorded parameter values p for an expected power density averaged across the frequency range as a function of the operating parameters P. To this end, for example, a linear multiple regression model is trained for each frequency range, which as the model function $\hat{\Phi}^{(1)}(P)$ to $\hat{\Phi}^{(N)}(P)$ delivers a linear function of the operating parameters P with coefficients (model parameters), which are determined in the method steps S6.1 to S6.N of the learning phase. Instead of a linear multiple regression model a complex model can also be trained, which also describes non-linear dependencies of the model function $\hat{\Phi}^{(1)}(P)$ to $\hat{\Phi}^{(N)}(P)$ of the operating parameters P.

The model functions $\hat{\Phi}^{(1)}(P)$ to $\hat{\Phi}^{(N)}(P)$ established for the different frequency ranges are in each case stored, in order to use them in the monitoring phase.

Figure 3:
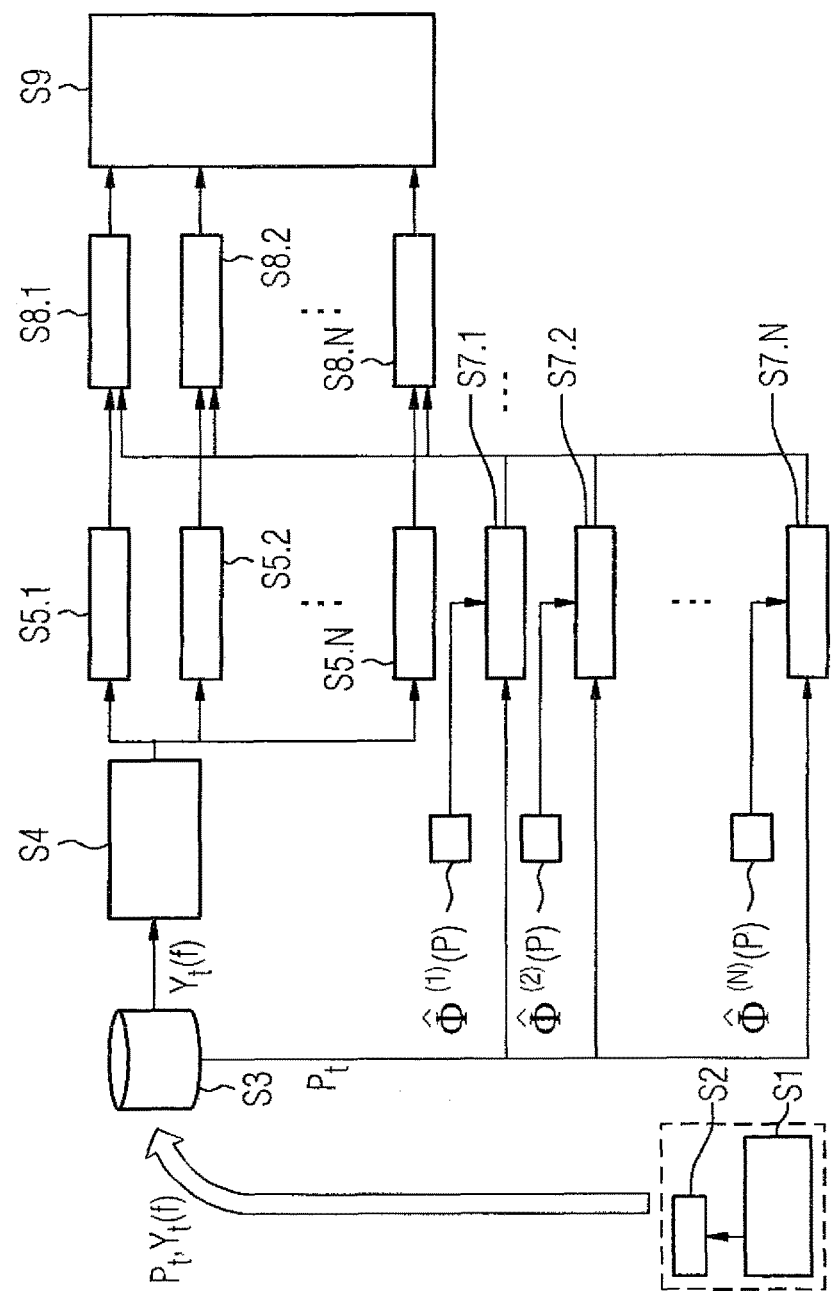
FIG. 3 shows a flowchart of a monitoring phase of a method for the monitoring of a machine.

FIG. 3 shows a flowchart of a monitoring phase of the method. During the monitoring phase the method steps S1 to S5.N are performed as in the learning phase, wherein at successive measurement times of the monitoring phase, for example periodically, parameter values $P_t$ of the operating parameters P of the machine and vibrations of the machine are recorded over a measurement duration and from these a mean power density $\Phi_t^{(i)}$ is in each case determined according to equation [1] for each measurement time and for the same frequency ranges as in the learning phase.

Furthermore, in method steps S7.1 to S7.N, for each measurement time and each frequency range an expected mean power density $\hat{\Phi}^{(i)}(P_t)$ is formed as a function value of the model function $\hat{\Phi}^{(1)}(P)$ to $\hat{\Phi}^{(N)}(P)$ established in the learning phase for the respective frequency range at the point defined by the parameter values $P_t$ recorded at the respective measurement time.

In method steps S8.1 to S8.N, for each measurement time and each frequency range a deviation measure is formed for the deviation of the mean power density $\Phi_t^{(i)}$ established from the vibrations recorded from the expected mean power density $\hat{\Phi}^{(i)}(P_t)$.

Here, for example, a power density difference $z_t^{(i)}$ normalized to a standard normal distribution is in each case formed according to $$z_t^{(i)} = \frac{\delta_t^{(i)} - \mu_{t-1}^{(i)}}{\sigma_{t-1}^{(i)}} \qquad [2]$$

as a deviation measure. Here $\delta_t^{(i)}$ denotes a power density difference between the mean power density $\Phi_t^{(i)}$ established from the vibrations recorded and the expected mean power density $\hat{\Phi}^{(i)}(P_t)$, formed according to $$\delta_t^{(i)} = \Phi_t^{(i)} - \hat{\Phi}^{(i)}(P_t), \quad [3]$$

$\mu_t^{(i)}$ a smoothed expected value, which is formed for a measurement time depending on the power density difference $\delta_t^{(i)}$ for this measurement time, the smoothed expected value $\mu_{t-1}^{(i)}$ for the measurement time preceding the measurement time and a smoothing parameter $\lambda$ according to $$\mu_t^{(i)} = \lambda \delta_t^{(i)} + (1-\lambda)\mu_{t-1}^{(i)}, \quad [4]$$

and $\sigma_t^{(i)}$ a smoothed standard deviation, which is formed for a measurement time depending on the power density difference $\delta_t^{(i)}$ and the smoothed expected value $\mu_t^{(i)}$ for this measurement time and the smoothed standard deviation $\sigma_{t-1}^{(i)}$ for the measurement time preceding the measurement time and according to smoothing parameter $\lambda$ according to $$(\sigma_t^{(i)})^2 = \lambda(\delta_t^{(i)} - \mu_t^{(i)})^2 + (1-\lambda)(\sigma_{t-1}^{(i)})^2. \quad [5]$$

Here the smoothing parameter $\lambda$ is formed according to $$\lambda = 1 - \exp\left(\frac{-1}{\tau f_s}\right) \quad [6]$$

from a predefinable time constant $\tau$ and a sampling rate $f_s$, for the recording of the vibrations of the machine (that is the reciprocal $f_s$ of the difference of two immediately successive measurement times). Starting values for the smoothed expected value and the smoothed standard deviation are for example determined from the mean power densities $\Phi_t^{(i)}$ established during the learning phase.

Equation [1] normalizes the power density differences $\delta_t^{(i)}$ in each case to standard-normal distributed normalized power density differences $z_t^{(i)}$, which in each case specify a distance to their own distribution. Expressed in another way, the power density differences $\delta_t^{(i)}$ are thereby transformed into statistical values, so that customary confidence intervals of the standard normal distribution can be used for their interpretation. The distribution parameters $\mu_t^{(i)}$ and $\sigma_t^{(i)}$ used to calculate the normalized power density differences $z_t^{(i)}$ are adaptively determined on a continuous basis by recursive exponential smoothing according to the equations [4] to [6].

As well as the clear statistical interpretability of the normalized power density differences $z_t^{(i)}$ of the various frequency ranges the method advantageously enables what is known as detrending for the elimination of undesirable effects of long-term trends on the results. For example possibly occurring trend signal components, which stem for example from natural wear and tear and progress only slowly, can be eliminated by subtraction of the sliding smoothed expected values $\mu_{t-1}^{(i)}$ from the power density differences $\delta_t^{(i)}$ in equation [1] by specifying a sufficiently large time constant $\tau$. Signals of appropriately timed relatively rapidly occurring anomalies are not influenced thereby.

Figure 4:
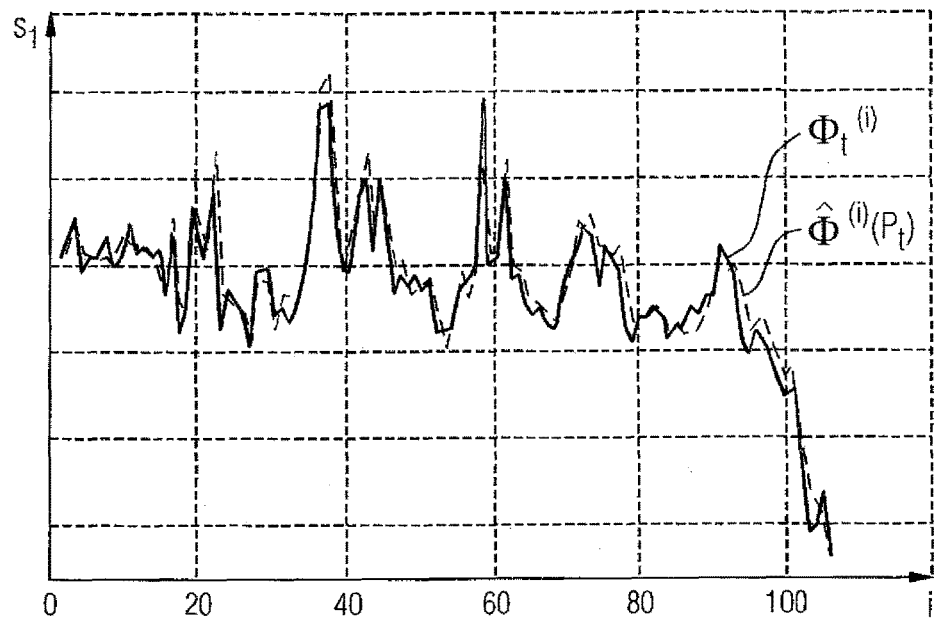
FIG. 4 shows a mean power density for a measurement time established from recorded vibrations and an expected mean power density depending on the frequency range.

By way of example FIG. 4 shows, for a measurement time with the time index t, a mean power density $\Phi_t^{(i)}$ established from recorded vibrations and an expected mean power density $\hat{\Phi}^{(i)}(P_t)$ depending on the frequency range, wherein $\Phi_t^{(i)}$ and $\hat{\Phi}^{(i)}(P_t)$ are shown according to a suitably selected logarithmic scale $s_1$.

Figure 5:
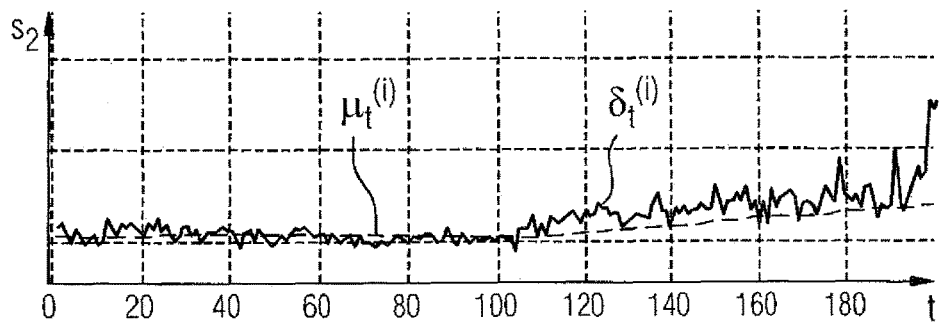
FIG. 5 shows, for a frequency range, a power density difference between a mean power density, which is determined for a measurement time from recorded vibrations, and an expected mean power density for the measurement time and a smoothed expected value of the power density differences depending on the measurement time.
Figure 6:
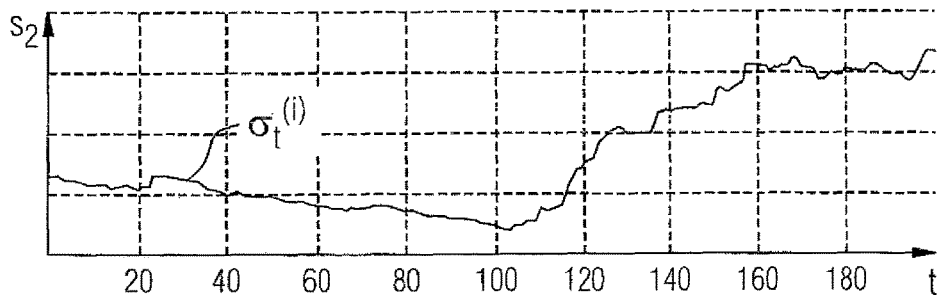
FIG. 6 shows, for a frequency range, a smoothed standard deviation of the power density differences depending on the measurement time.

By way of example FIGS. 5 and 6 show, for a frequency range with the frequency range index i, a power density difference $\delta_t^{(i)}$ and a corresponding smoothed expected value $\mu_t^{(i)}$ (FIG. 5) and a corresponding smoothed standard deviation $\sigma_t^{(i)}$ (FIG. 6) depending on the time index t of the measurement times on a suitably selected scale $s_2$.

In a method step S9 the deviation measures formed in the method steps S8.1 to S8.N are evaluated.

To this end, for example, a tolerance interval T is predefined for the deviation measures formed in the method steps S8.1 to S8.N and it is determined for each measurement time and each frequency range, whether the respective deviation measure lies within the predefined tolerance interval T.

In the case that the deviation measures are in each case formed as a normalized power density difference $z_t^{(i)}$ according to the equations [2] to [6], a suitable confidence interval of the standard normal distribution, for example a 3σ-confidence interval, is predefined as the tolerance interval T, and in method step S9 a binary output signal $\gamma_t^{(i)}$ is generated for each measurement time and each frequency interval, which assumes the value zero, if the respective normalized power density difference $z_t^{(i)}$ lies within the predefined tolerance interval, and otherwise assumes the value one. In the case of a tolerance interval T predefined as a 3σ-confidence interval of the standard normal distribution, the binary output signal $\gamma_t^{(i)}$ for the measurement time with the time index t and the frequency interval with the frequency range index i thus formed according to $$\gamma_t^{(i)} = \begin{cases} 1 & \text{falls } |z_t^{(i)}| \geq 3\sigma \\ 0 & \text{falls } |z_t^{(i)}| < 3\sigma \end{cases}, \quad [7]$$

wherein σ is the standard deviation of the standard normal distribution.

N binary output signals $\gamma_t^{(i)}$ which can be evaluated for monitoring of the machine are thereby generated per measurement time for each vibration sensor, for example with a total output signal being formed from the binary output signals $\gamma_t^{(i)}$, and/or they are visualized in a suitable manner.

Figure 7:
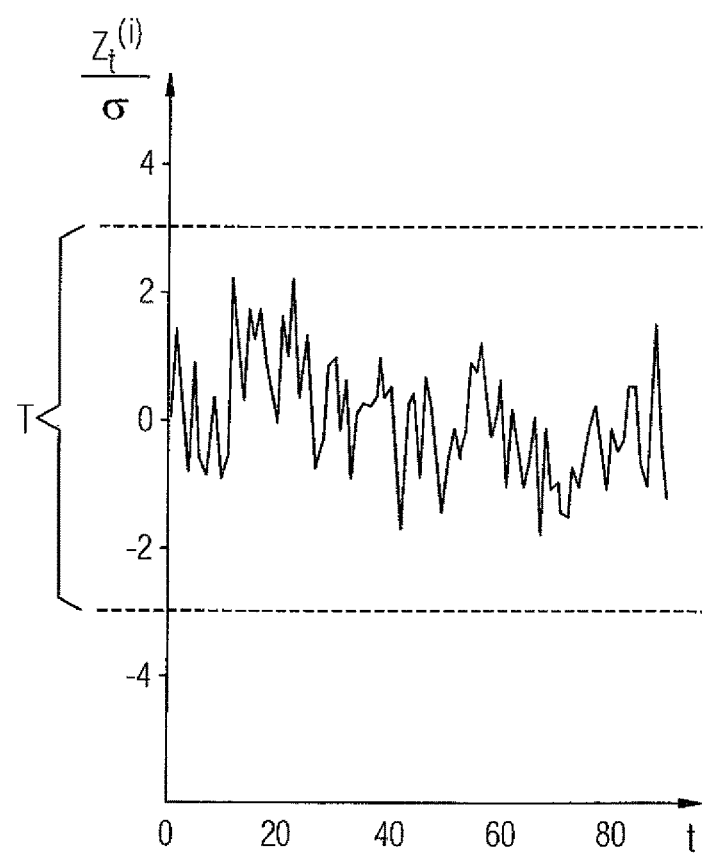
FIG. 7 shows, for a frequency range, a normalized power density difference depending on the measurement time.

By way of example FIG. 7 shows, for a frequency range with the frequency range index i, a normalized power density difference $z_t^{(i)}$ in units of the standard deviation σ of the standard normal distribution depending on the time index t of the measurement times. By way of example the 3σ-confidence interval of the standard normal distribution is further shown as tolerance interval T. In the time interval seen in the example shown, the normalized power density difference $z_t^{(i)}$ runs within the tolerance interval T.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for monitoring of a machine with a rotating machine component, in an automated manner, and carrying out maintenance measures for the rotating machine component, the method comprising:

at successive measurement times recording value ($P_t$) of at least one operating parameter, and recording vibrations of the machine over a predefined measurement duration;

for each measurement duration determining a vibration spectrum ($Y_t(f)$) of vibration amplitudes and vibration frequencies (f) of the vibrations recorded during the measurement duration;

determining a mean power density ($\Phi_t^{(i)}$) of the vibration spectrum ($Y_t(f)$) for a plurality of frequency ranges of the recorded vibration frequencies;

for each measurement time and each frequency range, forming a deviation measure for a deviation of the mean power density ($\Phi_t^{(i)}$) from an expected mean power density ($\hat{\Phi}^{(i)}(P_t)$) selected for a respective frequency and the at least one parameter value ($P_t$) recorded at the respective measurement time, and carrying out maintenance measures for the machine with the rotating machine component.

2. The method of claim 1, wherein the expected mean power density ($\hat{\Phi}^{(i)}(P_t)$) is established during a learning phase comprising:

at successive measurement times recording value ($P_t$) of at least one operating parameter, and recording vibrations of the machine over a predefined measurement duration;

for each measurement duration determining a vibration spectrum ($Y_t(f)$) of vibration amplitudes and vibration frequencies (f) of the vibrations recorded during the measurement duration;

determining a mean power density ($\Phi_t^{(i)}$) of the vibration spectrum ($Y_t(f)$) for a plurality of frequency ranges of the recorded vibration frequencies;

for each frequency range determining a model function ($\hat{\Phi}^{(1)}(P)$ to $\hat{\Phi}^{(N)}(P)$) forming the mean power densities ($\Phi_t^{(i)}$) corresponding with respective measurement times and at least one parameter value ($P_t$), thereby establishing a plurality of expected power density ($\hat{\Phi}^{(i)}(P_t)$) values as a function of respective frequency and the at least one parameter value ($P_t$).

3. The method of claim 1, wherein the machine is a transmission.

4. The method of claim 1, wherein the at least one of the operating parameters is selected from a group consisting of torque, rotational speed, and temperature of the machine or a portion thereof.

5. The method of claim 1, wherein the width of the frequency ranges grows monotonously with increasing vibration frequency (f).

6. The method of claim 1, wherein the model function ($\hat{\Phi}^{(1)}(P)$ to $\hat{\Phi}^{(N)}(P)$) is determined for each frequency range as a linear function of the operating parameters, with a linear multiple regression model being trained for estimation of the model function ($\hat{\Phi}^{(1)}(P)$ to $\hat{\Phi}^{(N)}(P)$).

7. The method of claim 1, further comprising forming, as a deviation measure for each measurement time and each frequency range, a power density difference ($z_t^{(i)}$) normalized to a standard normal distribution between the mean power density ($\Phi_t^{(i)}$) established from the recorded vibrations and the expected mean power density ($\hat{\Phi}^{(i)}(P_t)$).

8. The method of claim 7, wherein the normalized power density difference ($z_t^{(i)}$) for a measurement time and a frequency range is formed according to $$z_t^{(i)} = \frac{\delta_t^{(i)} - \mu_{t-1}^{(i)}}{\sigma_{t-1}^{(i)}}$$

from a power density difference ($\delta_t^{(i)}$) between the mean power density ($\Phi_t^{(i)}$), which is determined from the vibrations recorded at the measurement time, and the mean power density ($\hat{\Phi}^{(i)}(P_t)$) expected for the measurement time, a smoothed expected value ($\mu_t^{(i)}$) of the power density differences ($\delta_t^{(i)}$) for a measurement time preceding the measurement time and a smoothed standard deviation ($\sigma_t^{(i)}$) of the power density differences ($\delta_t^{(i)}$) for the measurement time preceding the measurement time.

9. The method of claim 8, wherein the smoothed expected value ($\mu_t^{(i)}$) for a measurement time is formed depending on the power density difference ($\delta_t^{(i)}$) for the measurement time and the smoothed expected value ($\mu_t^{(i)}$) for the measurement time preceding the measurement time according to $$\mu_t^{(i)} = \lambda \delta_t^{(i)} + (1-\lambda)\mu_{t-1}^{(i)},$$

wherein $\lambda$ is a smoothing parameter.

10. The method of claim 8, wherein the smoothed standard deviation ($\sigma_t^{(i)}$) for a measurement time is formed depending on the power density difference ($\delta_t^{(i)}$) and the smoothed expected value ($\mu_t^{(i)}$) for this measurement time and the smoothed standard deviation ($\sigma_t^{(i)}$) for the measurement time preceding the measurement time according to $$(\sigma_t^{(i)})^2 = \lambda(\delta_t^{(i)} - \mu_t^{(i)}) + (1-\lambda)(\sigma_{t-1}^{(i)})^2,$$

wherein $\lambda$ is a smoothing parameter.

11. The method of claim 10, wherein the smoothing parameter is formed according to $$\lambda = 1 - \exp\left(\frac{-1}{\tau f_S}\right)$$

from a predefinable time constant $\tau$ and a sampling rate $f_s$ of the recording of the vibrations of the machine.

12. The method of claim 1, further comprising providing a tolerance interval (T) for the deviation measure; and for each measurement time and for each frequency range determining whether the deviation measure lies within the predefined tolerance interval (T).

* * * * *

UNITED STATES PATENT AND TRADEMARK OFFICE
CERTIFICATE OF CORRECTION

PATENT NO. : 10,330,567 B2  
APPLICATION NO. : 15/098664  
DATED : June 25, 2019  
INVENTOR(S) : Henning Ochsenfeld Page 1 of 1

It is certified that error appears in the above-identified patent and that said Letters Patent is hereby corrected as shown below:

In the Claims

In Column 10, Claim 10, Lines 39-40:

Replace the current formula $\left(\sigma_i^{(l)}\right) = \lambda\left(\delta_i^{(l)} - \mu^{(l)}\right) + (1-\lambda)\left(\sigma_{i-1}^{(l)}\right)^2$ with the correct formula -- $\left(\sigma_i^{(l)}\right)^2 = \lambda\left(\delta_i^{(l)} - \mu^{(l)}\right)^2 + (1-\lambda)\left(\sigma_{i-1}^{(l)}\right)^2$ --.

Signed and Sealed this  
Twentieth Day of August, 2019

Andrei Iancu  
*Director of the United States Patent and Trademark Office*